(No Model.)
T. J. KIELEY.
DAMPER REGULATOR.
No. 427,175. Patented May 6, 1890.
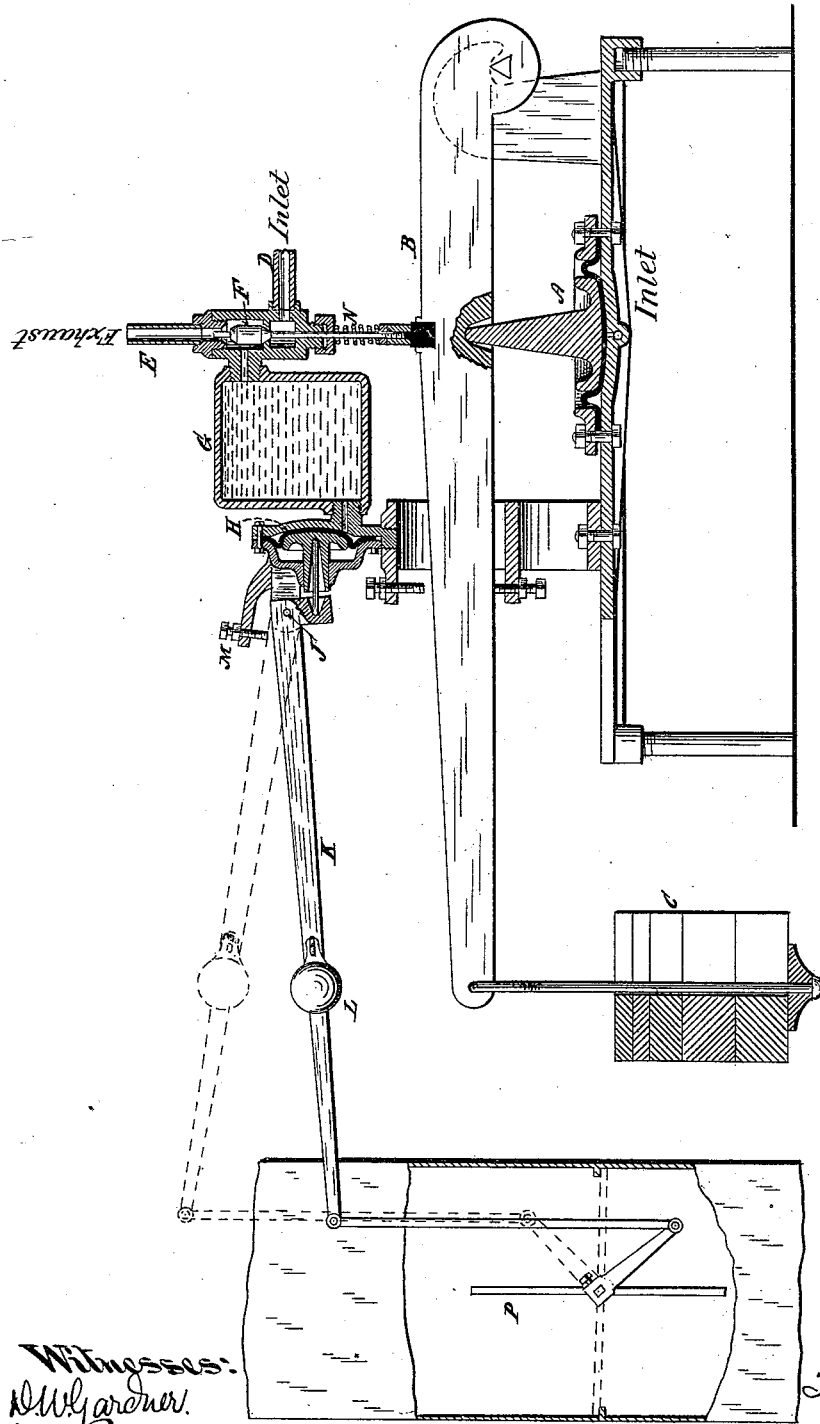
Witnesses:
D. W. Gardner.
W. W. Pollock
Inventor:
Timothy J. Kieley
By his Attorney
E. N. Dickerson Jr.

UNITED STATES PATENT OFFICE.

TIMOTHY J. KIELEY, OF NEW YORK, N. Y.

DAMPER-REGULATOR.

SPECIFICATION forming part of Letters Patent No. 427,175, dated May 6, 1890.

Application filed August 20, 1888. Serial No. 283,190. (No model.)

*To all whom it may concern:*

Be it known that I, TIMOTHY J. KIELEY, of the city, county, and State of New York, have invented a new and useful Improvement in Damper-Regulators, of which the following is a full, true, and exact description, reference being had to the accompanying drawing.

This invention relates to an improvement in apparatus for opening and closing a valve, and is especially adapted for opening and closing the damper or butterfly valve of a furnace, but may be applied to other uses.

The general principle of my invention, which, however, is not in and of itself new, is to cause the variation of pressure, say, in a boiler to operate a diaphragm or piston, which itself operates a valve controlling a secondary diaphragm, which does the work of opening and closing the damper, as will be hereinafter more fully set forth.

My invention will be readily understood from the accompanying drawing, which represents it in elevation and partly in section.

A represents a diaphragm of the kind ordinarily known as a "Clark damper," which operates the lever B, depressed by weight C. The varying pressure which is to control the damper P is connected with the bottom of this diaphragm A. Directly above the diaphragm and operated by the motion of the lever B is the valve F, which may be double, as shown, or it may be any ordinary three-way valve or any other suitable form and is connected with the pressure-inlet D and outlet E. This pressure may be the pressure of the steam in the boiler, but by preference is water-pressure from a suitable source. From the valve F the pressure passes into the chamber G, which connects with the supplemental diaphragm H. This supplemental diaphragm H operates the lever K, pivoted at J, which lever itself operates the damper P. The motion of this lever may be limited by the set-screw M, if desired. The intermediate chamber G serves as a sand-trap to prevent injurious substances passing into the chamber of the diaphragm H. The valve F may be directly connected by the lever B; but I prefer to mount it, as shown, so that its stem rests upon an elastic block in the lever B, with which, however, it is not connected, but by means of which a yielding movement is given that will prevent injury if from any reason the parts should not act as smoothly as they should, and the valve itself is depressed by the spring N bearing upon the valve-chamber.

The operation can now be readily understood. Upon a slight motion of the diaphragm A, which is sensitive by reason of the fact that it is removed to a considerable distance from the pivot of the lever B, the valve F is opened, whereupon the pressure passes through the inlet D and throws the diaphragm H outward, closing the damper P. A reverse motion of the lever B closes the inlet-passage and opens the outlet-passage, whereupon the weight L again opens the damper P.

What I claim as my invention, and desire to secure by Letters Patent, is—

1. The diaphragm A, operating the lever B, which itself operates the valve F, which is disconnected from the lever but controls the pressure upon the diaphragm H, the said diaphragm H and the valve F and its box being supported upon the same base as the diaphragm A, substantially as described.

2. The combination of the diaphragm A, operating the lever B, having an elastic block upon which the stem of the valve F rests controlling the pressure of the diaphragm H, said diaphragms being mounted at right angles to each other upon the same base and operated by independent motive powers, substantially as described.

3. The combination of the diaphragm A, operating the lever B, the casing G, having the diaphragm H, and the valve F, which rests upon and is operated by the lever B, and the lever K, operated by the diaphragm H and which in turn operates the damper P, substantially as described.

4. The combination of the diaphragm A, lever B, valve F, disconnected from but resting upon and elevated by lever B and depressed by spring N, and suitable connections for the operation of diaphragm H, substantially as described.

In testimony whereof I have signed my name to this specification in the presence of two subscribing witnesses.

TIMOTHY J. KIELEY.

Witnesses:
WM. A. POLLOCK,
ANTHONY GREF.